United States Patent
Lorian et al.

(10) Patent No.: US 6,647,416 B1
(45) Date of Patent: Nov. 11, 2003

(54) MANAGEMENT INFORMATION BASE (MIB) WITH THRESHOLD CROSSING ALERT (TCA) PROFILES

(75) Inventors: Yuval Lorian, Ramat-Gan (IL); Michal Nosatzki, Rishon Lezion (IL)

(73) Assignee: ECI Telecom Ltd., Petach-Tikva (IL)

( * ) Notice: Subject to any disclaimer, the term of this patent is extended or adjusted under 35 U.S.C. 154(b) by 377 days.

(21) Appl. No.: 10/009,197

(22) PCT Filed: Jun. 7, 2000

(86) PCT No.: PCT/IL00/00328
§ 371 (c)(1), (2), (4) Date: Aug. 6, 2002

(87) PCT Pub. No.: WO00/77964
PCT Pub. Date: Dec. 21, 2000

(30) Foreign Application Priority Data

Jun. 10, 1999 (IL) .................................................. 130415

(51) Int. Cl.[7] .............................................. G06E 15/73
(52) U.S. Cl. ....................................................... 709/224
(58) Field of Search ................................ 709/223, 224; 370/252, 395

(56) References Cited

U.S. PATENT DOCUMENTS

| | | | |
|---|---|---|---|
| 5,473,608 A | | 12/1995 | Cagne et al. |
| 5,796,723 A | | 8/1998 | Bencheck et al. |
| 5,913,037 A | * | 6/1999 | Spofford et al. ............ 709/226 |
| 5,974,237 A | * | 10/1999 | Shurmer et al. ............ 709/224 |
| 6,021,117 A | * | 2/2000 | Juniper et al. .............. 370/252 |
| 6,076,107 A | * | 6/2000 | Chen et al. ................. 709/224 |
| 6,115,362 A | * | 9/2000 | Bosa et al. ................. 370/248 |
| 6,119,158 A | * | 9/2000 | Kawagoe .................... 709/223 |

* cited by examiner

*Primary Examiner*—Mehmet B. Geckil
(74) *Attorney, Agent, or Firm*—Browdy and Neimark, P.L.L.C.

(57) ABSTRACT

A logical Management Information Base (MIB) residing in a Network Element (NE) including one or more Performance Management (PM) Group managed entities each having at least one PM Counter attribute, and a pointer; and a Threshold Crossing Alert (TCA) profile managed entity, each instance thereof having at least one PM Counter attribute, and an associated threshold value, where an instance of an PM Group managed entity points to an instance of the TCA profile managed entity whose at least one PM Counter attribute match those of the PM Group managed entity whereupon each of whose at least one PM Counter attribute is correspondingly assigned a threshold value from the TCA profile managed entity instance.

20 Claims, 5 Drawing Sheets

US 6,647,416 B1

MANAGEMENT INFORMATION BASE (MIB) WITH THRESHOLD CROSSING ALERT (TCA) PROFILES

REFERENCE TO RELATED APPLICATIONS

The present application is the national stage under 35 U.S.C. 371 of international application PCT/IL00/00328, filed Jun. 7, 2000 which designated the United States, and which international application was published under PCT Article 21(2) in the English language.

FIELD OF THE INVENTION

The invention relates to telecommunication networks in general and performance management of a network element in particular.

BACKGROUND OF THE INVENTION

A telecommunication network typically includes a Network Management Station (NMS), and one or more Network Elements (NEs) each having a dedicated logical Management Information Base (MIB) resident therein for configuration, control and monitoring purposes. One aspect of an NE's MOB is employed for performance management purposes in particular, including the monitoring and correcting the behavior and effectiveness of a to telecommunication network, and an NE, and to aid in planning and analysis.

In a document entitled "M4 Interface Requirements and Logical MIB: ATM Network Element View—AF-NM-0020.001" dated October 1998, and published by the ATM Forum Technical Committee, Section 2.3 entitled Performance Management stipulates eleven Performance Management (PM) managed entities for network data collection purposes divided into four PM Groups as shown in FIG. 1: First, an ATM PM Group including an ATM Cell Protocol Monitoring Current Data managed entity having four PM Counter attributes, and an TC Adapter Protocol Monitoring Current Data managed entity including a single PM Counter attribute. Second, an DS3/E3 PM Group including an DS3/E3 Current managed entity having ten PM Counter attributes, an DS3 Far End Current managed entity having four PM Counter attributes, and an ATM DS3 PLCP Protocol Monitoring Current Data managed entity having two PM Counter attributes. Third, an SONET/SDH PM Group including an SONET/SDH Section Current Table managed entity, an SONET/SDH Line Current Table managed entity, an SONET/SDH Far End Line Current Table managed entity, an SONET/SDH Path Current Table managed entity, and an SONET/SDH Far End Path Current Table managed entity each having four PM Counter attributes. And lastly, an VPL-TP PM Group including an UPC/NPC Disagreement Monitoring Current Data managed entity having four PM Counter attributes per VPL termination point, This document fiber stipulates that each PM Group managed entity sends an autonomous notification of a threshold crossing alert (TCA) to an NMS when one of its PM Counter attributes exceeds its pre-set threshold value, the notification including the ID of the instances of the PM Counter managed entity reporting the TCA and their actual values.

In a proposed SNMP implementation of the above referenced ATM Forum document numbered AF-NM-0095.001 in IETF's RFC 1451-SNMPv2 M2M MIB, the TCA autonomous notification requirement was met by providing each instance of PM Group managed entity with one or more instances of PM Counter managed entities as appropriate, and each instance of an PM Counter managed entity with a Threshold Data ID attribute pointing to an instance of a Threshold Data managed entity which contains its threshold value (see FIG. 2). In accordance with SNMP practice, each instance of an PM Counter managed entity is allocated a row in a table which defines all the threshold values for all the instances of a MIB's PM counters such that the total number of rows in the table equals the total number of a MIB's PM counter instances as a function of both datastream types, for example, ATM over DS3, ATM over SDH STM1, and the like, and their respective quantities.

This approach for assignment of threshold values to PM counters has the advantage of maximum granularity, namely, the threshold value of each PM counter can be individually customized but the downside is that the approach quickly becomes unwieldly for even a relatively simple NE as will be readily appreciated from the following example. An exemplary NE having 3 Network Interface Cards (NICs) respectively supporting eight ATM over DS3 datastreams whose different transport levels are each policed by 5 ATM PM counters and 16 DS3/E3 PM counters, four ATM over SDH STM1 datastrems whose different transport levels are each policed by 5 ATM PM counters and 20 SONET/SDH PM counters, and a single ATM over SDH STM4 data stream whose different transport levels are policed by 5 ATM PM counters and 20 SONET/SDH PM counters, and each card having 512 Virtual Path Links Termination Points (VPL-TPs) equally divided between its datastreams and each requiring four PM counters per VPL-TP requires a table of a total of $(((8*5)+(8*16)+(512*4))+((4*5)+(4*20)+(512*4))+((1*5)+(1*20)+(512*4)))=6437$ rows.

SUMMARY OF THE INVENTION

In accordance with the present invention, there is provided for use with is a Network Element (NE) in a telecommunication network, the NE having a logical Management Information Base (MIB) resident therein, the MIB comprising:

(a) one or more Performance Management (PM) Group managed entities each having at least one PM Counter attribute, and a pointer; and (b) a Threshold Crossing Alert (TCA) profile managed entity, each instance thereof having at least one PM Counter attribute, and an associated threshold value, where an instance of an PM Group managed entity points to an instance of said TCA profile managed entity whose said at least one PM Counter attribute match those of said PM Group managed entity instance whereupon each of whose said at least one PM Counter attribute is correspondingly assigned a threshold value from said TCA profile managed entity instance.

The present invention is based on the notion that threshold values for PM counters should be assigned per instance of an PM Group managed entity for TCA autonomous notification purposes as stipulated inter alia by the ATM Forum's AF-NM-0095.001 document as opposed to per instance of an PM Counter managed entity in accordance with the above-mentioned IETF's RFC 1451-SNMPv2 M2M MIB. The benefits of the present invention are particularly realized when updating an NE in terms of the datastreams terminating thereat, and even more so when updating threshold values of PM counters, and to a lesser extent during telecommunication network set-up, and NE initialization. Moreover, the present invention is particularly beneficial for NEs supporting homogeneous datastreams, and can be readily augmented to existing MIBs as required by the industry. And finally, the same assignment granularity can be theoretically obtained as in IETF's RFC 1451-SNMPv2 M2M MIB if the number of instances of the TCA profile managed entity equals the number of instances of an PM Group managed entity, however, typically far fewer TCA profile managed entity instances are required in practice.

BRIEF DESCRIPTION OF THE DRAWINGS

In order to understand the present invention and to see how it may be carried out in practice, a preferred embodiment will now be described, by way of a non-limiting example only, with reference to the following drawings, in which.

DETAILED DESCRIPTION OF THE DRAWINGS

Figure 1A:
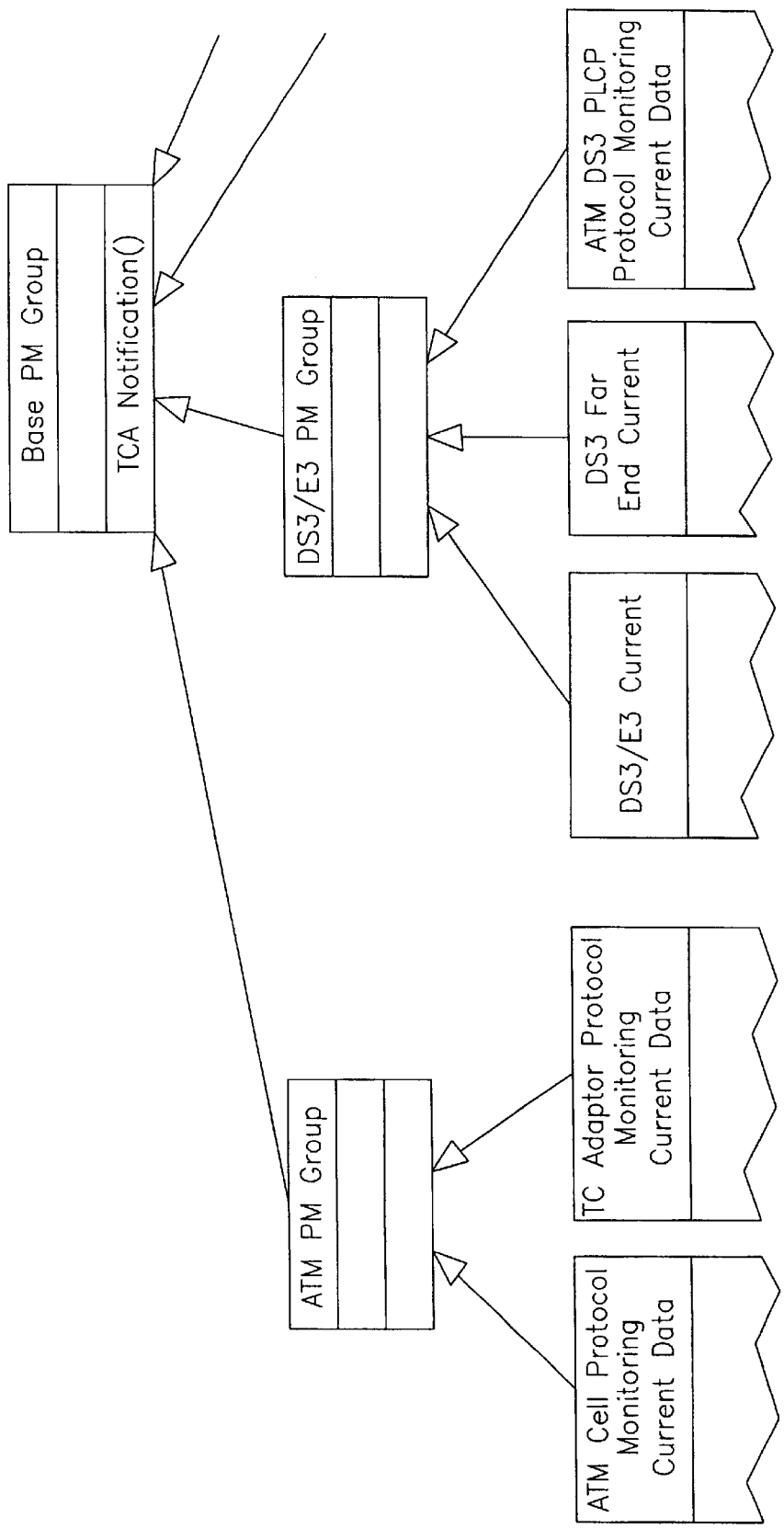
FIGS. 1A and 1B show two parts of an object model diagram depicting a MIB's performance management network data collection functionality in accordance with ATM Forum's AF-NM-0020.001 document.
Figure 1B:
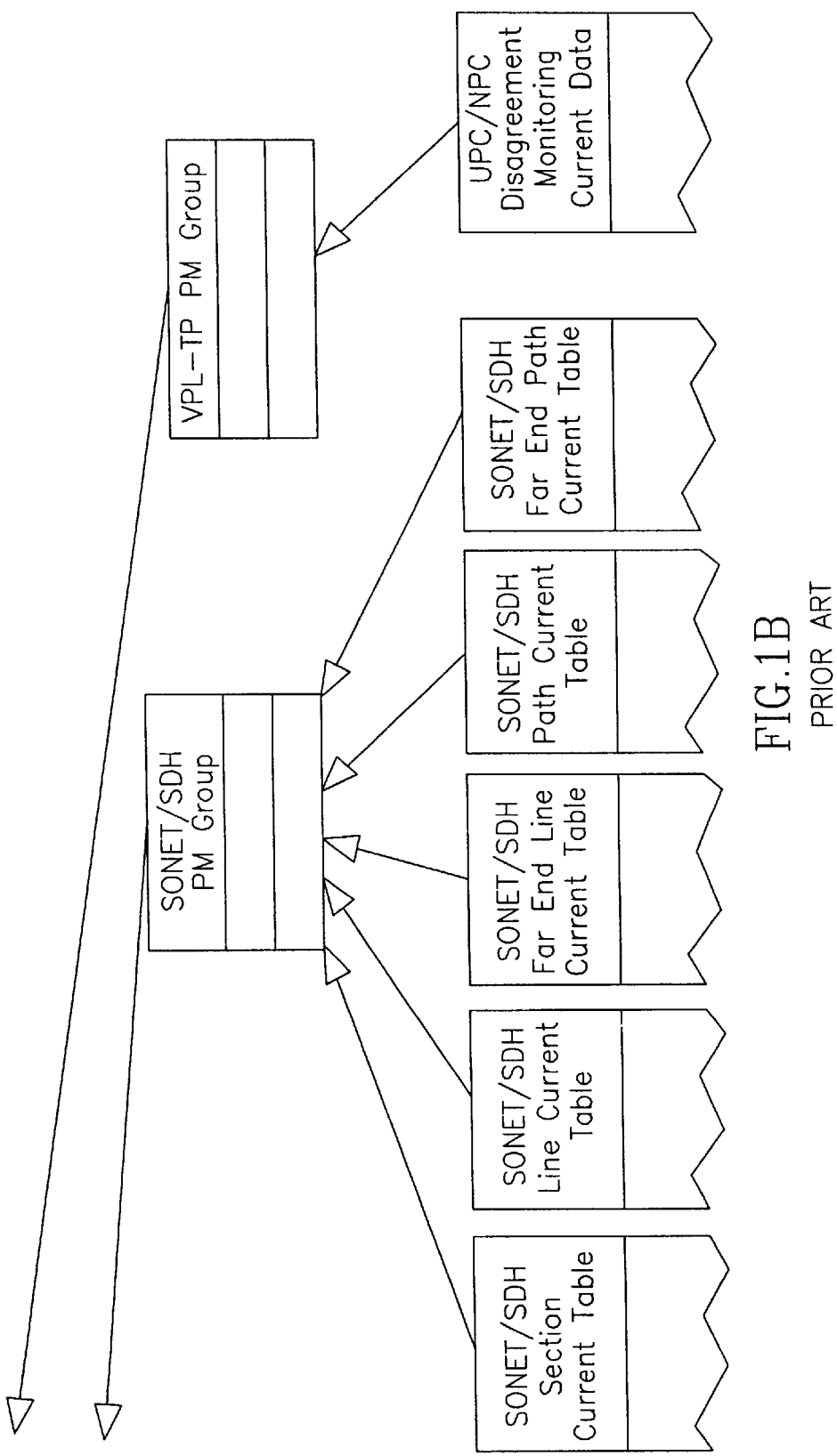
Figure 2:
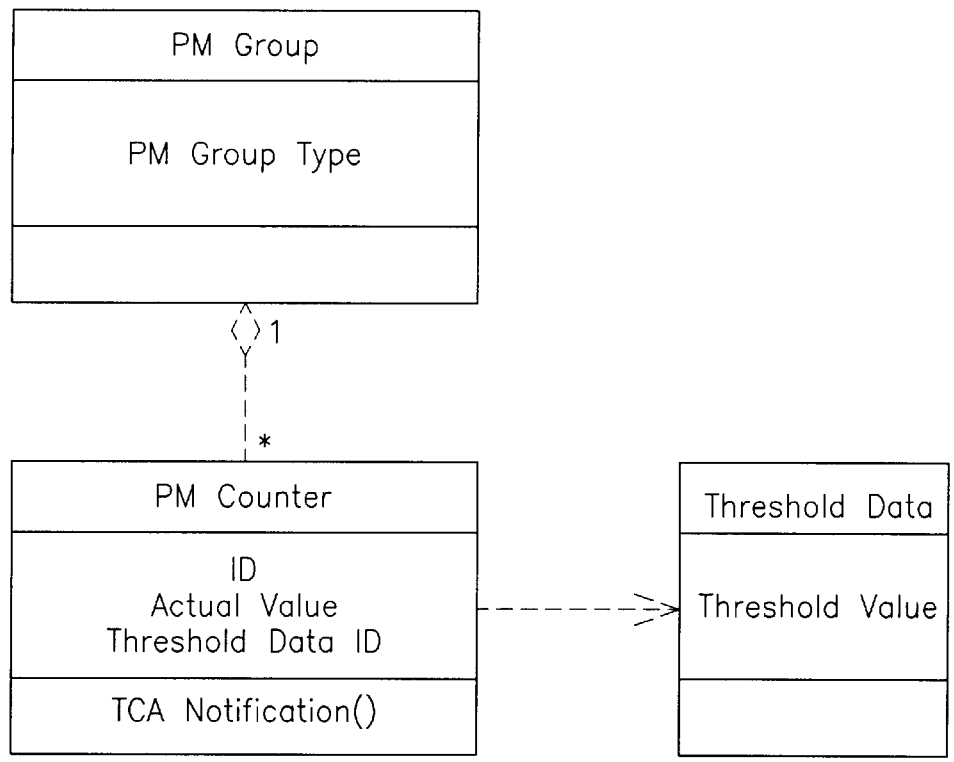
FIG. 2 is an object model diagram depicting a MIB's threshold crossing alert autonomous notification functionality in accordance with IETF's RFC 1451-SNMPv2 M2M MIB.
Figure 3:
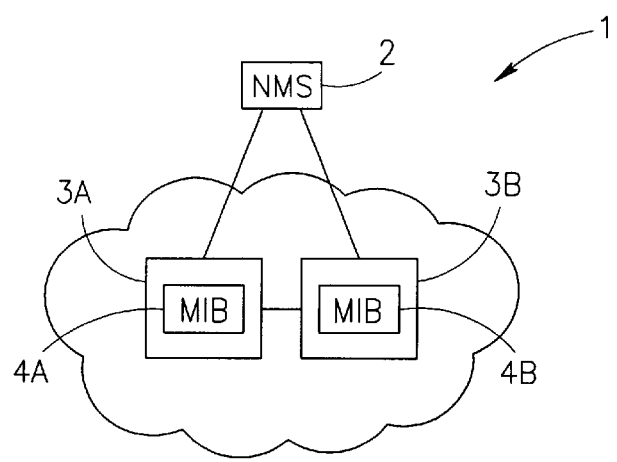
FIG. 3 is a schematic representation depicting a telecommunication network suitable for implementation of the present invention.

FIG. 3 shows that a telecommunication network 1 includes a Network Management Station (NMS) 2 and two NEs 3A and 3B respectively having logical management information bases (MIBs) 4A and 4B resident therein. The NEs can be any one of the following list; a bridge, a Digital Cross connect System (DCS), a hub, a router, switch, and the like. The MIBs can be implemented by any suitable network management protocol including but not limited to SNMP, CMIP, CORBA, and TL1.

Figure 4:
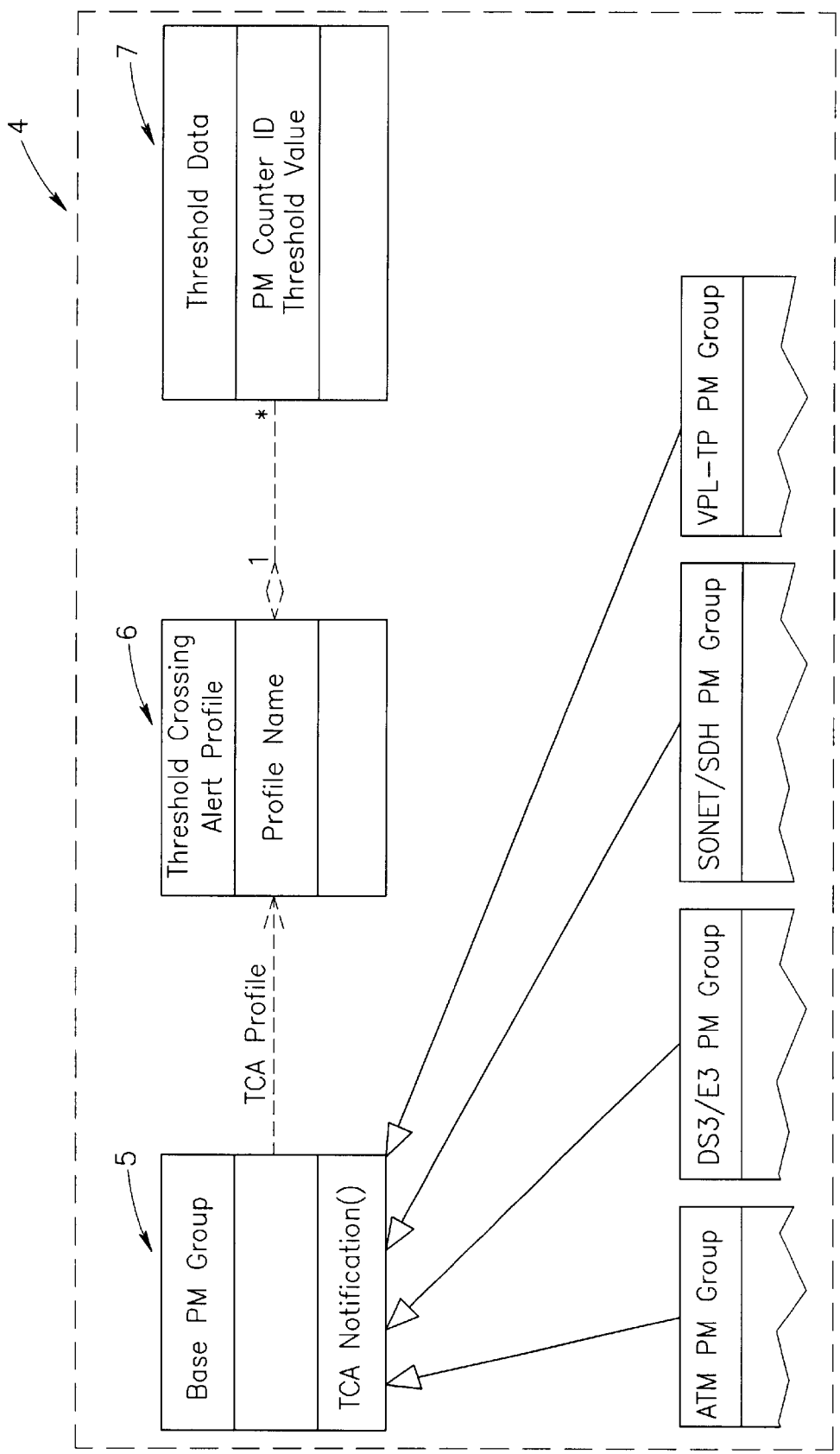
FIG. 4 is an object model diagram depicting a MIB's threshold crossing alert autonomous notification functionality in accordance with the present invention.

FIG. 4 shows that a MIB 4 of the present invention includes a Threshold Crossing Alert (TCA) Profile managed entity 6 intermediate the PM Group managed entities 5 and the Threshold Data managed entities 7. Each instance of an PM Group managed entity has a single TCA Profile ID attribute for pointing to a specific instance of the TCA Profile managed entity 6 which includes a variable number of Threshold Data managed entity instances, each of them including an PM Counter ID attribute and a Threshold Value attribute.

Figure 5A:
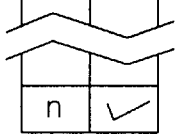
FIGS. 5A and 5B are tables of an SNMP implementation of a MIB's threshold crossing alert autonomous notification function in accordance with the present invention.

FIG. 5A shows that an SNMP implemented TCA profile managed entity is in the form of a 2 dimension table having a fit column with TCA profile indices, and a second column of TCA profile status for indicating whether a TCA profile is operable or inoperable.

Figure 5B:
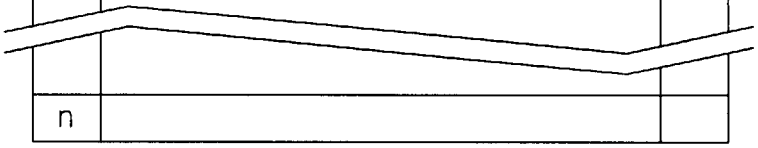

FIG. 5B shows that an SNMP implemented Threshold Data managed entity is in the form of a 3 dimension table having a first column with TCA profile indices, a second column with PM Counter identifiers, and a third column with threshold values. A single TCA profile can be correlated to one or more PM Group managed entities in which case it is termed a composite TCA profile.

For the sake of convenience, a composite TCA profile can be defined for all the PM counters of all the PM Group managed entities of one datastream type, for example, ATM over DS3, ATM over SDH STM1 or its SONET equivalent, ATM over SDH STM4 or its SONET equivalent and the like such that in the case of the exemplary NE described in the Background of the Invention, the MIB would have three composite TCA profiles respectively having 25 thresholds for the PM counters policing an ATM over DS3/E3 datastream, 29 thresholds for the PM courses policing an ATM over SDH STM1 datastream or its SONET equivalent, and 29 thresholds for the PM counters policing an ATM over SDH STM4 datastream or its SONET equivalent.

Preferably, since all the instances of the PM Group managed entities point to a default TCA profile, this profile can be a composite TCA profile with threshold values for all the PM counters of all the PM Group managed entities of all the different datastream types, namely, the default TCA profile would have a total of 45 PM counters as follows: the five ATM PM counters, the sixteen ATM over DS3/E3 PM counters, the twenty SONET/SDH PM counters, and the four VPL-TP PM counters. However, it should be noted that since different daydream types typically have different optimal threshold values for the same PM counter, this approach often assigns incorrect threshold values to those PM counters which are common between the different datastream types. For example, in the case that the optimal threshold values for the ATM PM counter atmfM4CellProtoCurrProtoErrors are 15, 10 and 8 for an ATM over DS3 datastream, an ATM over SDH STM1 datastream and an ATM over SDH STM4 datastream, respectively, and the default TCA profile has a threshold of 15, then corrective action has to be taken in respect of the ATM over SDH datastreams by way of pointing their PM Group managed entity instances to other TCA profiles managed entity instances.

Reverting to the exemplary NE described in the Background of the Invention, in the event of the use of a default TCA profile with thresholds for all the PM counters of all the PM Group managed entities of all the datastream types and whose threshold values are set as being the optimal threshold values for an ATM over DS3/E3 datastream for the common ATM PM Group managed entities' PM counters and the DS3/E3 PM Group managed entities' PM counters and the optimal thresholds for an ATM over SDH STM1 datastream for the SONET/SDH PM Group managed entities' PM counters, the number of threshold assignments which are required after NE initialization during which all the instances of the PM Group managed entities automatically point to the default TCA profile is as follows: (0+((4*5)+0+(512*4))+((1*5)+(1*20)+(512*4)))=4141.

While the invention has been described with respect to a limited number of embodiments, it can be appreciated that many variations, modifications, and other applications of the invention can be made without departing from the scope of the claims appended hereto.

What is claimed is:

1. For use with a Network Element (NE) in a telecommunication network, the NE having a logical Management Information Base (MIB) resident therein, the MIB comprising:

(a) one or more Performance Management (PM) Group managed entities each having at least one PM Counter attribute, and a pointer; and (b) a Threshold Crossing Alert (TCA) profile managed entity, each instance thereof having at least one PM Counter attribute, and an associated threshold value, where an instance of an PM Group managed entity points to an instance of said TCA profile managed entity whose said at least one PM Counter attribute match those of said PM Group managed entity instance whereupon each of whose said at least one PM Counter attribute is correspondingly assigned a threshold value from said TCA profile managed entity instance.

2. The MIB according to claim 1 and further comprising at least one composite TCA profile managed entity instance having threshold values for all the PM counters of two or more different PM Group managed entities.

3. The MIB according to claim 2 wherein said composite TCA profile managed entity instance has threshold values for all the PM counters of all the PM Group managed entities associated with a particular datastream type associated with NE.

4. The MIB according to claim 1 and further comprising a default TCA profile managed entity instance having threshold values for all the PM counters of all the PM Group managed entities of all the different datastream types associated with the NE.

5. A method for assigning a threshold value to a Performance Management (PM) Counter of a logical Management Information Base (MIB) resident in a Network Element (NE) of a telecommunication network, the method comprising the steps of:

(a) providing a MIB with one or more Performance Management (PM) Group managed entities each having at least one PM Counter attribute, and a pointer; and a Threshold Crossing Alert (TCA) profile managed entity, each instance thereof having at least one PM Counter attribute, and an associated threshold value; and (b) pointing an instance of an PM Group managed entity to an instance of the TCA profile managed entity whose at least one PM Counter attribute match those of the PM Group managed entity whereupon each of whose at least one PM Counter attribute is correspondingly assigned a threshold value from the TCA profile managed entity instance.

6. The method according to claim 5 and further comprising at least one composite TCA profile managed entity instance having threshold values for all the PM counters of two or more different PM Group managed entities.

7. The method according to claim 6 wherein said composite TCA profile managed entity instance has threshold values for all the PM counters of all the PM Group managed entities associated with a particular datastream type associated with the NE.

8. The method according to claim 5 and further comprising a default TCA profile instance having threshold values for all the PM counters of all the PM Group managed entities of all the different datastream types associated with the NE.

9. A program storage device readable by a machine and tangibly embodying a program of instructions executable by the machine to perform method steps for assigning a threshold to a Performance Management (PM) Counter of a logical Management Information Base (MIB) resident in a Network Element (NE) of a telecommunication network, the method steps including:

(a) providing a MIB with one or more Performance Management (PM) Group managed entities each having at least one PM Counter attribute, and a pointer; and a Threshold Crossing Alert (TCA) profile managed entity, each instance thereof having at least one PM Counter attribute, and an associated threshold value; and (b) pointing an instance of an PM Group managed entity instance to an instance of the TCA profile managed entity whose at least one PM Counter attribute match those of the PM Group managed entity whereupon each of whose at least one PM Counter attribute is correspondingly assigned a threshold value from the TCA profile managed entity instance.

10. The device according to claim 9 and further comprising at least one composite TCA profile managed entity instance having threshold values for all the PM counters of two or more different PM Group managed entities.

11. The device according to claim 10 wherein said composite TCA profile managed entity instance has threshold values for all the PM counters of all the PM Group managed entities associated with a particular datastream type associated with the NE.

12. The device according to claim 9 and further comprising a default TCA profile instance having threshold values for all the PM counters of all the PM Group managed entities of all the different datastream types associated with the NE.

13. A computer program product comprising a computer useable medium having computer readable code embodied therein for assigning a threshold to a Performance Management (PM) Counter of a logical Management Information Base (MIB) resident in a Network Element (NE) of a telecommunication network, the MIB including:

(a) one or more Performance Management (PM) Group managed entities, each one thereof having at least one PM Counter attribute, and a pointer; and (b) a one or more Threshold Crossing Alert (TCA) profile managed entity, each instance thereof having at least one PM Counter attribute, and an associated threshold value, where an instance of an PM Group managed entity points to an instance of said TCA profile managed entity whose said at least one PM Counter attribute match those of said PM Group managed entity whereupon each of whose said at least one PM Counter attribute is correspondingly assigned a threshold value from said TCA profile managed entity instance.

14. The product according to claim 13 and further comprising at least one composite TCA profile managed entity instance having threshold values for all the PM counters of two or more different PM Group managed entities.

15. The product according to claim 14 wherein said composite TCA profile managed entity instance has threshold values for all the PM counters of all the PM Group managed entities associated with a particular datastream type associated with the NE.

16. The product according to claim 13 and further comprising a default TCA profile instance having threshold values for all the PM counters of all the PM Group managed entities of all the different datastream types associated with the NE.

17. A telecommunication network comprising:

a Network Management Station (NMS); and at least one Network Element (NE) associated with said NMS, said at least one NE having a logical Management Information Base (MIB) resident therein the MIB comprising:

(a) one or more Performance Management (PM) Group managed entities, each one thereof having at least one PM Counter attribute, and a pointer; and (b) a one or more Threshold Crossing Alert (TCA) profile managed entity, each instance thereof having at least one PM Counter attribute, and an associated threshold value, where an instance of an PM Group managed entity points to an instance of said TCA profile managed entity whose said at least one PM Counter attribute match those of said PM Group managed entity whereupon each of whose said at least one PM Counter attribute is correspondingly assigned a threshold value from said TCA profile managed entity instance.

18. The network according to claim 17 and further comprising at least one composite TCA profile managed entity instance having threshold values for all the PM counters of two or more different PM Group managed entities.

19. The network according to claim 18 wherein said composite TCA profile managed entity instance has threshold values for all the PM counters of all the PM Group managed entities associated with a particular datastream type associated with the NE.

20. The network according to claim 17 and further comprising a default TCA profile instance having threshold values for all the PM counters of all the PM Group managed entities of all the different datastream types associated with the NE.

* * * * *